United States Patent [19]
Bigelow et al.

[11] Patent Number: 5,408,657
[45] Date of Patent: Apr. 18, 1995

[54] METHOD OF IMPOSING MULTI-OBJECT CONSTRAINTS ON DATA FILES IN A DATA PROCESSING SYSTEM

[75] Inventors: Richard H. Bigelow, Mission Viejo; John P. Thompson, El Toro, both of Calif.

[73] Assignee: Unisys Corporation, Blue Bell, Pa.

[21] Appl. No.: 243,721

[22] Filed: May 17, 1994

Related U.S. Application Data

[63] Continuation of Ser. No. 741,706, Aug. 7, 1991, abandoned.

[51] Int. Cl.⁶ .......................... G06F 15/40; G06F 7/00
[52] U.S. Cl. .................. 395/600; 364/222.81; 364/222.82; 364/282.1; 364/283.4; 364/DIG. 1
[58] Field of Search ................. 395/600, 650, 700

[56] References Cited

U.S. PATENT DOCUMENTS 5,133,068 7/1992 Crus et al. ......................... 395/600
5,226,158 7/1993 Horn et al. ......................... 395/600

Primary Examiner—Kevin A. Kriess
Assistant Examiner—John P. Chavis
Attorney, Agent, or Firm—Charles J. Fassbender; Mark T. Starr; Stanton Weinstein

[57] ABSTRACT

A method, in a data processing system, of imposing constraints on data files which are changed by update statements, includes the steps of: a) identifying a particular object of the update $O_x$ and a particular attribute being updated; b) finding an applicable constraint based on the particular attribute being updated; c) converting the particular update object $O_x$ to at least one other object which is in the applicable constraint and is different than the update object $O_x$; and, d) generating an error message, if after the update, the applicable constraint is not satisfied by any object from the converting step.

11 Claims, 5 Drawing Sheets

| | | |
|---|---|---|
| C1 | EMPLOYEE SALARY | < 1.2 × SALARY OF EMPLOYEE MANAGER |
| C2 | MANAGER'S SALARY | > AVERAGE SALARY OF MANAGER'S DIRECT REPORTS |
| C3 | COMBINED SALARY OF ALL EMPLOYEES ON A PROJECT | < 0.5 × TOTAL BUDGET FOR PROJECT |

41

| | ATTRIBUTE BEING UPDATED | APPLICABLE CONSTRAINT |
|---|---|---|
| ROW #1 | EMPLOYEE SALARY | C1, C2, C3 |
| ROW #2 | EMPLOYEE TITLE | C1, C2 |
| ROW #3 | NEW PROJECT | C3 |

METHOD OF IMPOSING MULTI-OBJECT CONSTRAINTS ON DATA FILES IN A DATA PROCESSING SYSTEM

This is a continuation of application Ser. No. 07/741,706, filed on Aug. 7, 1991, now abandoned.

BACKGROUND OF THE INVENTION

This invention relates to data processing systems of the type which include various data files; and more particularly, it relates to computer implemented methods for imposing multi-object constraints on updates to such data files.

By a data file in a data processing system is herein meant any sort of computer record which contains several objects and which assigns certain attributes to each of those objects. For example, the objects of a data file can be the employees of a corporation; and, the attributes which are assigned to each employee in the file can be the employee's name, his salary, his manager, etc.

Also in a data processing system, there can be more than one file, each of which have their own objects. Further, an attribute in any one file can be an object of the second file which in turn has its own attributes; an attribute in the second file can be an object in a third file which in turn has its own attributes; etc. In this manner, objects of different files are related and linked together.

For example, the objects of one file (an employee file) can be all of the employees of a company; the objects of a second file (a manager file) can be all of the employees who are managers of a company; and, the objects of a third file (a project file) can be all of the projects of a company. In the employee file, each manager will be included as an attribute of the particular employees who report to that manager; and in the manager file, each project will be included as an attribute of the particular manager who manages that project.

Often in a data processing system, the attributes and/or the objects of the data files are not static; but instead, they are continually being updated. For example, an employee's salary may increase; an employee's manager may change; etc. These changes are initiated by update statements which are issued to the data processing system. Such update statements need not have any particular form; they only need to specify the objects of the update and the attributes that are to be changed.

In order to maintain the integrity of the data files, it is desirable to be able to impose on them multi-object constraints of any kind, and to have those constraints be enforced automatically whenever an update is made. One such constraint might, for example, limit the salary of an employee based on the funds of a project; another such constraint might limit the salary of a manager based on the average salary of all of the employees who work for the manager; etc. In general, with a multi-object constraint, the attributes of any file object are limited as a function of the attributes of one or more other file objects. However, in the prior art, no method for imposing such multi-object constraints existed.

Accordingly, a primary object of the invention is to provide a method in a data processing system of imposing multi-object constraints on the data files.

BRIEF SUMMARY OF THE INVENTION

In accordance with the present invention, multi-object constraints are imposed on data files in a data processing system by the following steps. Initially, an update statement which specifies a change to a particular attribute of a particular object is sent to the data processing system. This update statement is then examined in the data processing system by a constraint enforcer program to identify the particular object of the update and the particular attribute being updated. Thereafter, the constraint enforcer program uses the identified particular attribute being updated to find a multi-object constraint that applies to (i.e.—may be violated by) the update. Subsequently, the constraint enforcer program converts the identified particular object of the update to all of the objects in the applicable multi-object constraint. Since there are multiple objects in the constraint, at least one of them then will be different than the particular object of the update. Thereafter, the constraint enforcer program checks to determine if the applicable constraint is satisfied by all of the constraint objects from the above converting step; and, it generates an error message if it is not.

To convert the particular object of the update to the multiple objects of the constraint, the constraint enforcer program sometimes reads the file of the update object and generates constraint objects depending upon certain attributes in the update object's file. At other times, the constraint enforcer program reads the files of non-update objects that are attributes of the update object, and it generates constraint objects depending upon the attributes of the non-update objects. Such converting steps enable the constraint objects to be related in any desired fashion to the update object.

BRIEF DESCRIPTION OF THE DRAWINGS

Various features and advantages of the invention are described herein in conjunction with the accompanying drawings wherein:

FIG. 3 shows a pair of tables which are used in performing one of the steps 30-5 in FIG. 2;

DETAILED DESCRIPTION

Figure 1:
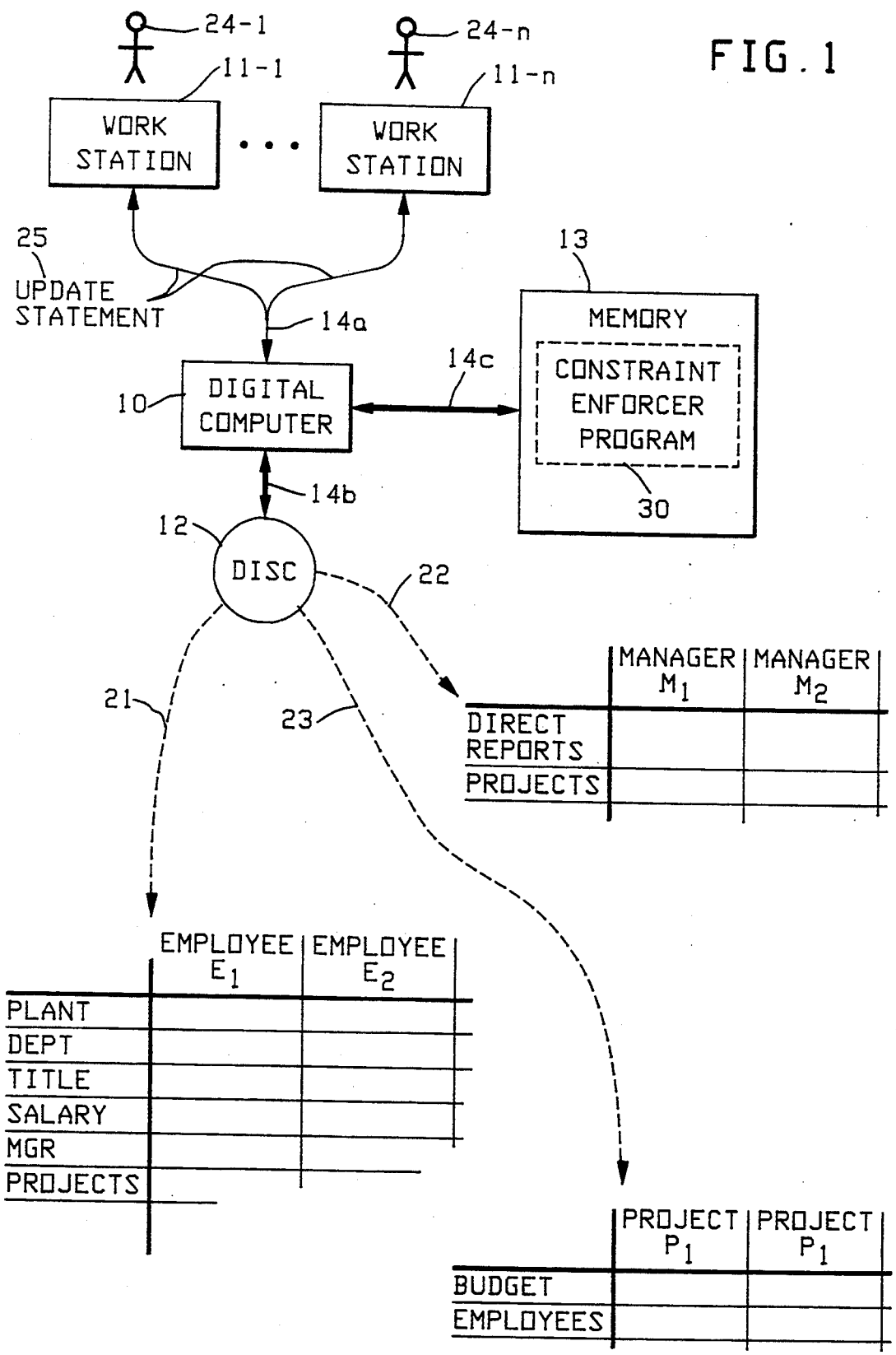
FIG. 1 shows a data processing system which imposes multi-object constraints on data files in accordance with the invention.

Referring now to FIG. 1, it shows a data processing system in which multi-object constraints are imposed on data files in accordance with the invention. This FIG. 1 data processing system includes a digital computer 10, several workstations 11-1 thru 11-n, a magnetic disc storage unit 12, and an integrated circuit memory 13. Components 11-1 thru 11-n, 12, and 13 are interconnected to the digital computer 10 by respective data buses 14a, 14b, and 14c as shown.

Stored in the disc 12 are various data files. Examples of these files are indicated in FIG. 1 by reference numerals 21, 22, and 23. Each file contains several objects; and it contains certain attributes for each of those objects, some of which may be objects for other files. In the FIG. 1 example, each file is arranged as a matrix of rows and columns; an object heads each column; and respective attributes are in each row.

In file 21, the file objects are employees $E_1$, $E_2$, ... of some particular company. Also in file 21, the attributes of each employee are: a "plant" at which the employee works; a "department" to which the employee belongs; a "title" such as an engineer or a manager; a current "salary" for the employee; a "manager" to whom the employee reports; and one or more "projects" on which the employee works.

In file 22, the file objects are the company's managers $M_1$, $M_2$, ..., each of whom is also listed in file 21 as an object "employee" and as employee attribute "manager". Further, in file 22, the attributes of each manager are: one or more "direct reports", who are employees of file 21 that report directly to the manager; and one or more "projects" of which the manager is in charge.

In file 23, the file objects are "projects" $P_1$, $P_2$, ... which are attributes in file 22. And, the attributes of each project are: a "budget" for the project and all "employees" of file 21 who work on the project.

From time to time, various attributes and/or objects of the files 21 thru 23 need to be updated. For example, the salary of an employee may be increased; the title of an employee may change from engineer to manager; certain direct reports of a manager may be added or deleted; etc. Such changes to the files are initiated by operators 24-1 thru 24-N of the workstations 11-1 thru 11-N. Each change is specified in an update statement 25 which is sent on bus 14a from one of the workstations to computer 10.

Figure 2:
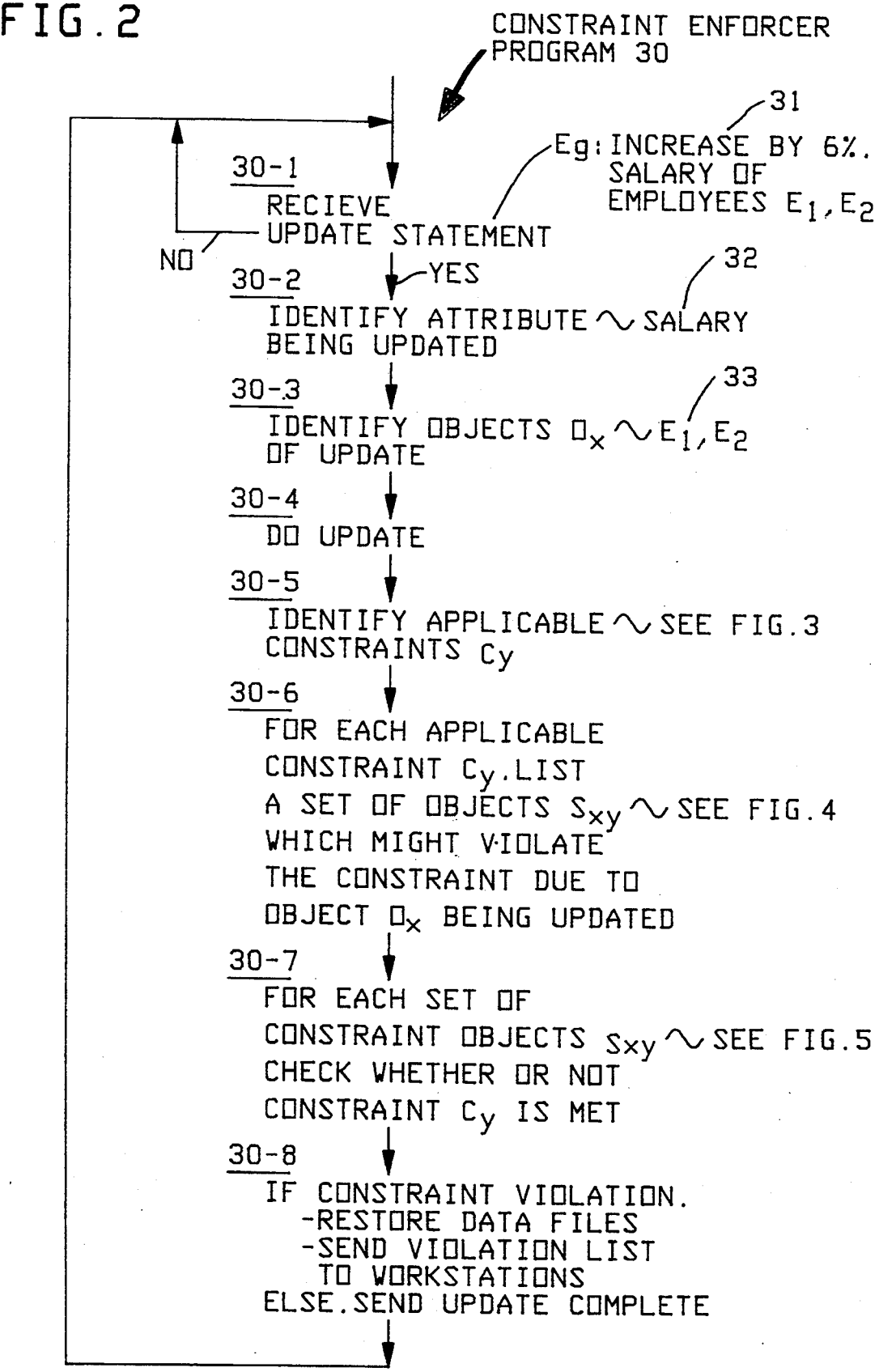
FIG. 2 is a flow chart which shows the major steps that are performed by a constraint enforcer program in the FIG. 1 data processing system.

In computer 10, each update statement is processed by a constraint enforcer program 30 which is stored in memory 13. All of the major steps which the constraint enforcer program 30 performs are shown in FIG. 2 and are identified by reference numerals 30-1 thru 30-7. Steps 30-5, 30-6 and 30-7 are quite complex, so they are shown in greater detail in FIG. 3, FIG. 4, and FIG. 5.

Initially in step 30-1, the update statement is received from bus 14a. Reference numeral 31 indicates an example of the received update statement in which the salary of two named employees $E_1$, $E_2$ is increased by 6%.

Next, in step 30-2, the received update statement is examined to determine which attribute is being updated. In the example update statement 31, the updated attribute is "salary" as is indicated by reference numeral 32.

Thereafter, in step 30-3, the received update statement is further examined to identify the update objects $O_x$. An update object $O_x$ is an object whose attributes are being changed. In the example update statement 31, the update objects $O_x$ are the employees $E_1$, $E_2$; and this is indicated by reference numeral 33.

Subsequently, in step 30-4, the identified attribute of each update object $O_x$ is changed as specified by the update statement. For the example update statement 31, the files of employees $E_1$, $E_2$ are read; 6% is added to their current salary; and the result is written into the files of employee $E_1$, $E_2$ as their new current salary.

Next, in step 30-5, the identified attribute of step 30-2 is utilized to find the particular constraints $C_y$ that apply to the update. Which constraints are applicable depends upon the particular set of all constraints that are imposed on the data files and the particular attribute that is being changed. This dependency is illustrated in FIG. 3.

In FIG. 3, a Table 40 lists three constraints $C_2$, and $C_3$ as specific examples of the constraints that may be imposed on the data files. By constraint $C_1$, an employee's salary is restricted to be less then $1.2\times$ the salary of the employee's manager. By constraint $C_2$, a manager's salary is required to be greater than the average salary of the manager's direct reports. And by constraint $C_3$, the combined salary of all of the employees on a project is limited to be less than $\frac{1}{2}$ the total budget for the project.

Also in FIG. 3, another Table 41 correlates specific attributes that are changed via the update statement to specific constraints that are applicable to the update. Row 1 indicates that when the attribute which is changed is an employee's salary, then all of the constraints $C_1$, $C_2$, and $C_3$ apply. Row 2 indicates that when an employee's title is changed, then constraints $C_1$ and $C_2$ apply. Row 3 indicates that when a new project is added, then only constraint $C_3$ applies. In general, an applicable constraint is a constraint which involves the attribute that is to be changed.

Thereafter, for each combination of an update object $O_x$ and an applicable constraint $C_y$, a set of constraint objects $S_{x,y}$ is generated. This is done in the FIG. 2 program by step 30-6. Set $S_{x,y}$ is a set of certain objects in constraint $C_y$ which might violate that constraint due to the change that was made to the file of update object $O_x$.

In the example update statement 31, the update objects $O_x$ are the employees $E_1$ and $E_2$; and, the applicable constraints $C_y$ are constraints $C_1$, $C_2$, and $C_3$. These two update objects $O_x$ and three applicable constraints $C_y$ yield six different sets $S_{x,y}$. Set $S_{1,1}$ is a set of employee's on the left-hand side of constraint $C_1$ which might violate constraint $C_1$ due to the salary update of employee $E_1$; set $S_{1,2}$ is a set of managers on the left-hand side of constraint $C_2$ which might violate constraint $C_2$ due to the salary update of employee $E_1$; set $S_{1,3}$ is a set of projects on the right-hand side of constraint $C_3$ which might violate constraint $C_3$ due to the salary update of employee $E_1$; etc.

Figure 4:
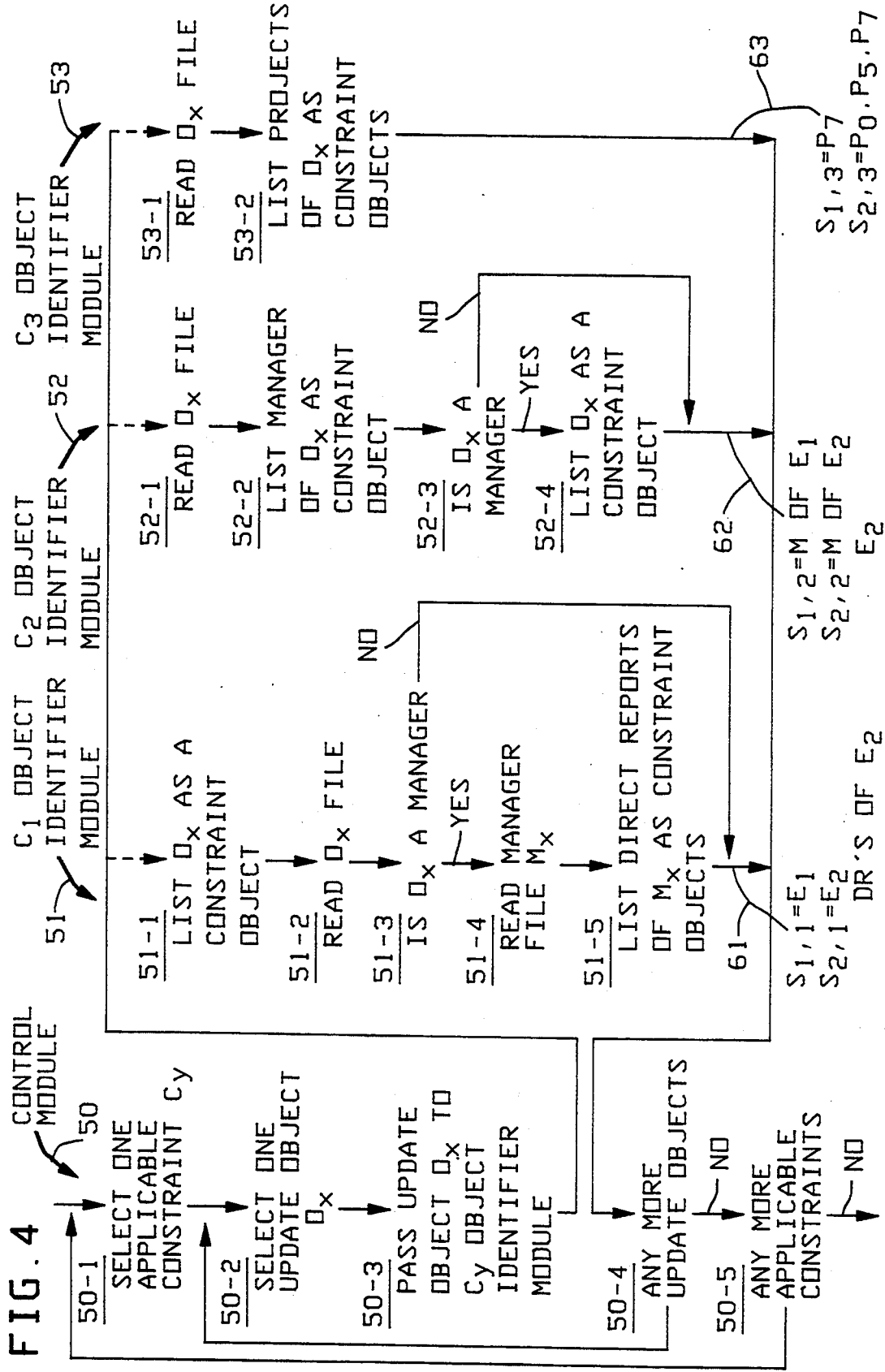
FIG. 4 is a flow chart which shows several substeps that are performed as step 30-6 in FIG. 2; and, FIG. 5 is flow chart which shows several substeps that are performed as another step 30-7 in FIG. 2.

How the sets of constraint objects $S_{x,y}$ are generated is shown in detail in FIG. 4. There, the process is performed by four modules 50, 51, 52, and 53. Module 50 is a control module which selectively passes the update objects $O_x$ to the other modules. Module 51 is a $C_1$ object identifier module which converts each received update object $O_x$ to a set of objects $S_{x,1}$ on the left-hand side of constraint $C_1$. Module 52 is a $C_2$ object identifier module which converts each received update object $O_x$ to a set of objects $S_{x,2}$ on the left-hand side of constraint $C_2$. And, module 53 is a $C_3$ object identifier module which converts each received update object $O_x$ to a set of objects $S_{x,3}$ on the right-hand side of constraint $C_3$.

Considering now module 50 in detail, it in step 50-1 selects one of the applicable constraints $C_y$. Next in step 50-2, module 50 selects a particular update object $O_x$. Then in step 50-3, module 50 passes the selected update object $O_x$ to the $C_y$ object identifier module. After the $C_y$ object identifier module has run, steps 50-4 and 50-5 are performed. By step 50-4, the above steps 50-2 and 50-3 are repeated for each update object $O_x$; and by step 50-5, the above steps 50-1, 50-2, and 50-3 are repeated for each applicable constraint $C_y$.

Next, consider the details of module 51 wherein each received update object $O_x$ is converted to the set of constraint objects $S_{x,1}$ for constraint $C_1$. In step 51-1, the update object $O_x$ is included in the set of constraint objects $S_{x,1}$. Then in step 51-2, the employee file 21 of the update object $O_x$ is read. Thereafter, in step 51-3, a conditional branch is taken depending upon whether or not the above read file indicates that the object $O_x$ is a manager. If the object $O_x$ is a manager, then steps 51-4 and 51-5 are performed. In step 51-4, the manager file $M_x$ is read; and in step 51-5, all of the direct reports of manager $M_x$ are included in the set of constraint objects $S_{x,1}$.

As an example of the above steps, consider the employees $E_1$ and $E_2$ whose salary is being changed by the update statement 31, and suppose that employee $E_1$ is not a manager and employee $E_2$ is a manager. In that case, the set $S_{1,1}$ of constraint objects consist of employee $E_1$; whereas the set $S_{2,1}$ of constraint objects consists of employee $E_2$ and all of the direct reports of employee $E_2$. These sets are identified by reference numeral 61. Set $S_{2,1}$ shows that if the employee whose salary is being updated is a manager, then constraint $C_1$ must be checked against each direct report of that employee as well as against himself.

Considering next module 52, it shows several steps 52-1 thru 52-4 by which the update object $O_x$ is converted to the set of constraint objects $S_{x,2}$ for constraint $C_2$. In step 52-1, the file for the update object $O_x$ is read. Then in step 52-2, the manager M of the update object $O_x$ is included in the set of constraint objects $S_{x,2}$. Then in step 52-3, a conditional branch is taken depending upon whether or not the title of the update object $O_x$ is a manager. If the update object $O_x$ is a manager, then step 52-4 is performed wherein the update object is included in the set of constraint objects $S_{x,2}$.

As an example of these steps, again consider the employees $E_1$ and $E_2$ whose salary is being changed by the update statement 31; and, again suppose that employee $E_1$ is not a manager and employee $E_2$ is a manager. In that case, the set of constraint objects $S_{1,2}$ consist of the manager M of employee E; whereas the set of constraint objects $S_{2,2}$ consist of the manager M of employee $E_2$ and employee $E_2$ himself. These sets are identified by reference numeral 62. Set $S_{2,2}$ shows that if the employee whose salary is being updated is a manager, then constraint $C_2$ must be checked against himself as well as against his manager.

Finally, considering module 52, it shows the steps 53-1 and 53-2 by which the update object $O_x$ is converted to a set of constraint objects $S_{x,3}$ for constraint $C_3$. In step 53-1, the file of the update object $O_x$ is read. Then, in step 53-2, the projects from the above read file are listed as being the objects of the constraint.

As an example of the above, suppose that employee $E_1$ whose salary is being changed works on project $P_7$, and suppose that employee $E_2$ manages projects $P_0$, $P_5$, and $P_7$. In that case, the set of constraint objects $S_{1,3}$ of employee $E_1$ consists of project $P_7$; whereas the set of constraint objects $S_{2,3}$ consists of projects $P_0$, $P_5$, and $P_7$. This is indicated by reference numeral 63. Set $S_{2,3}$ shows that if the employee whose salary is being updated works on multiple projects, then constraint $C_3$ must be checked for each of those projects.

After all of the sets $S_{x,y}$ of constraint objects have been generated, step 30-7 of the FIG. 2 process is performed. There, for each set of constraint objects $S_{x,y}$, a check is made to determine whether or not constraint $C_y$ is met. How this check is performed is shown in detail in FIG. 5.

Figure 5:
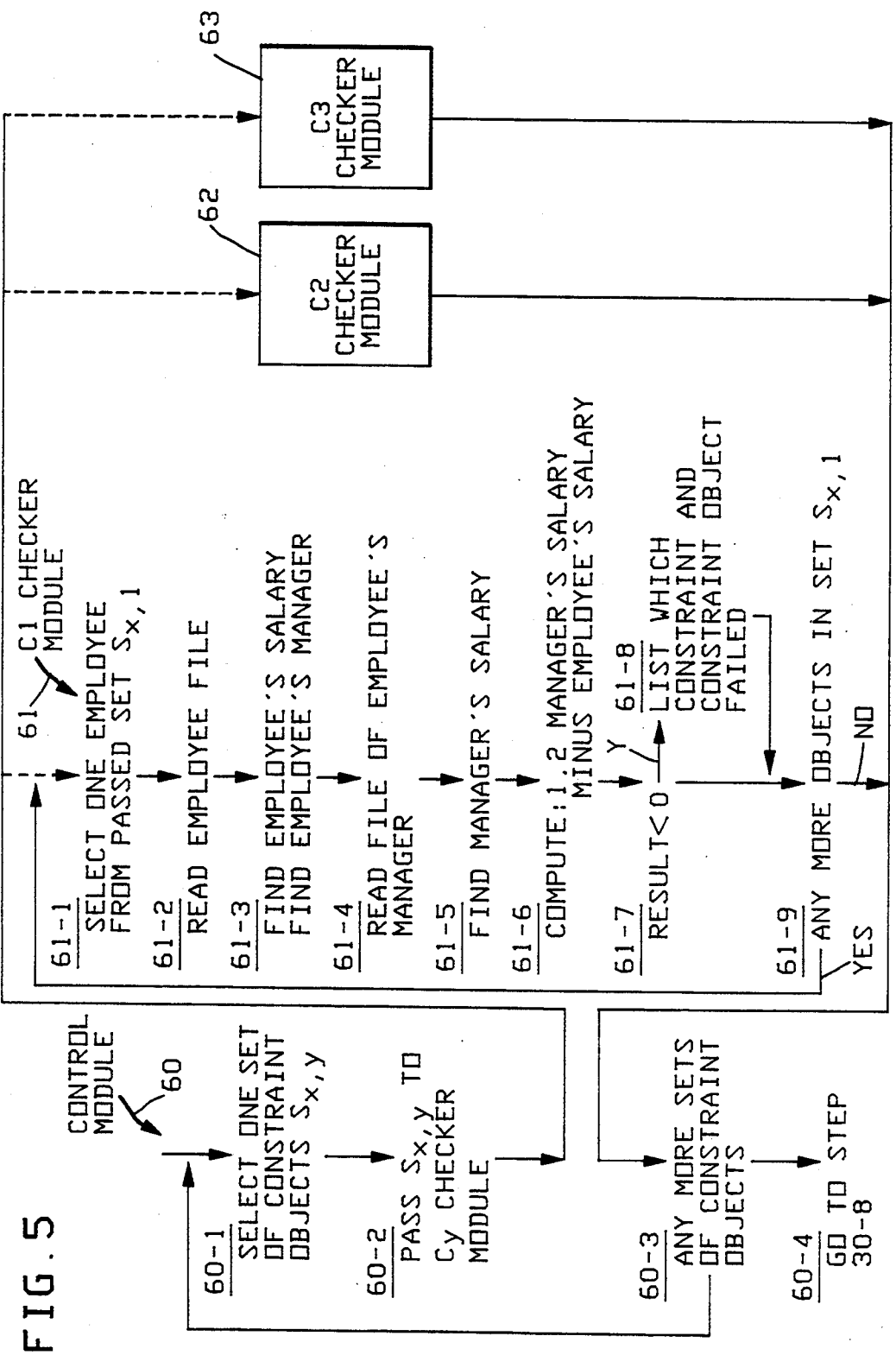

In FIG. 5, the checking is performed by a control module 60 and three constraint checker modules 61, 62, and 63. Module 60 sequentially passes each of the sets $S_{x,y}$ of constraint objects to one of the checker modules. Module 61 checks whether or not the received set of constraint objects meets constraint $C_1$; module 62 checks whether or not the received set of constraint objects meets constraint $C_2$; and module 63 checks whether or not the received set of constraint objects meets constraint $C_3$.

Step 60-1 of control module 60 selects one set of the constraint objects $S_{x,y}$. Next, step 60-2 passes the selected set of constraint objects $S_{x,y}$ to the $C_y$ constraint checker module. That is, set $S_{x,1}$ is passed to the $C_1$ checker module 61; set $S_{x,2}$ is passed to the $C_2$ checker module 62; etc. After the $C_y$ constraint checker module completes its execution, step 60-3 is performed wherein a branch is taken back to step 60-1 if there are any more sets of constraint objects $S_{x,y}$; otherwise, a branch is taken to the final step 30-8 of the FIG. 2 process.

Checker module 61 consists of steps 61-1 thru 61-9 as shown. Step 61-1 selects one employee from the passed set of constraint objects $S_{x,1}$. Step 61-2 reads the employee file 21 of FIG. 1 for the above selected employee. Then, step 61-3 uses the above read file 21 to find the employee's "salary" and his "manager". This manager together with the employee constitute all of the objects in the constraint $C_1$. Next, step 61-4 reads the employee file 21 of the above found "manager". Then, step 61-5 reads the "salary" entry in the above read file. Next, step 61-6 uses the salaries of steps 61-3 and 61-5 to compute 1.2 times the manager's salary minus the employee's salary. Next, step 61-7 makes a conditional branch depending upon whether or not the above computation results in a negative number. If the result is negative, then step 61-8 lists which constraint object failed constraint $C_1$. Lastly, step 61-9 branches back to step 61-1 if any more objects remain in the passed set of constraint objects $S_{x,1}$; otherwise, a branch is taken back to step 60-3.

Module 62 and 63 are similar in their overall form to module 61. However, module 62 is tailored to check whether or not the passed set of constraint objects $S_{x,2}$ meet constraint $C_2$; and, module 63 is tailored to check whether or not the passed set of constraint objects $S_{x,3}$ meets constraint $C_3$. In order for module 62 to perform its check, it must read file 22 to find the manager's direct reports, and it must read the employee's file of each direct report to find their salary. Likewise for module 63 to perform its check, it must read the project file 23 to determine all of the employees on a project, and it must read the employee file for each such employee to find their salary.

Following the passage of all of the constraint object sets $S_{x,y}$ to a respective constraint checker module 61-63, step 60-4 branches back to the final step 30-8 of the FIG. 2 process. There, if no constraint violation is listed, step 30-8 sends a message to the work station indicating that the update was completed successfully. Otherwise, if any constraint violation was listed by the modules 61-63, step 30-8 restores the data files 21, 22, and 23 of FIG. 1 back to their state which existed before the update step 30-4 was performed; and, it sends an error message to the work station from which the update statement was received in step 30-1. This error message can be of any format but preferably it includes the constraint violations list so that the workstation operator or another employee can analyze the violations and determine what corrective action is needed. Restoring the data files is performed by executing the update statement in reverse (e.g.—decreasing the salary of employees $E_1$ and $E_2$ by 6%) or by saving all data file entries before they are changed.

A preferred process for imposing constraints on data file updates in accordance with the invention has now been described in detail. In addition however, many changes and modifications can be made to the above described process without departing from the nature and spirit of the invention.

As one modification, the update statement can originate from various sources other than an operator at a workstation. For example, the update statement can be sent automatically by a computer program which resides in the FIG. 1 memory 13 and whose execution is time shared with the constraint enforcer program 30.

As another modification, the constraints which are imposed on the data files are clearly not limited to the three constraints $C_1$, $C_2$, and $C_3$ that are illustrated in FIG. 3. With the present invention, any constraint can be imposed on the data files. To impose any particular constraint, that constraint is first specified in a way which interrelates multiple objects and their attributes, such as is done by table 40 in FIG. 3. Then, a correlation is made between the attributes that can be updated and the applicability of the new constraint. Such a correlation is made by table 41 of FIG. 3. Then, a constraint object identifier module such as the modules 51, 52, and 53 of FIG. 4 is provided for the new constraint. Such a module receives as an input an update object $O_x$ whose file is being changed, and as an output the module generates a set of objects $S_{x,y}$ which could violate the constraint due to the update of the file of object $O_x$. Lastly, a checker module is provided for the new constraint, such as checker module 61 of FIG. 5. That checker module receives as an input the set of constraint objects $S_{x,y}$; and, for each object in the set the checker module determines whether or not the new constraint is met.

As still another modification, the files on which the constraints are imposed are not limited to the specific files 21, 22, and 23 of FIG. 1. With the present invention, the objects of the files can represent any physical entity (e.g.—an employee), any abstract entity (e.g.—project or department), and any event (e.g.—a sale or a project start date). Likewise, the attributes in the file can be any of the object's characteristics or properties. Further, the form or architecture of the files is not limited to a matrix of rows and columns; instead, the files can have any form which relates attributes to objects. Examples of such files are described in a book entitled "Fundamentals of Database Systems" by Elmasri and Navathe, published by The Benjamin/Cummings Publishing Co., Inc. 1989; and, a language for specifying such files is described in the American National Standard Database Language SQL with Integrity Enhancement ANSI X3.135–1989.

As yet another modification, step 30-5 of FIG. 2 which identifies the applicable constraints $C_y$ can be performed by comparing the attribute being updated to the attributes in all of the constraints. When a match occurs, the constraint applies. With this modification, the correlation table 41 of FIG. 3 is not needed.

As still one other modification, some of the tasks that are performed by the constraint checker modules can be shifted into the constraint object identifier modules, and vice-versa. In FIG. 4, the constraint $C_1$ object identifier module 51 finds all "employees" on the left-hand side of constraint $C_1$; and in FIG. 5, the constraint $C_1$ checker module 61 finds all remaining other objects in the constraint. By this splitting of the tasks a minimum number of objects are passed from module 51 to module 61; and only one checker module is needed per constraint. But as one alterative, the constraint object identifier module 51 can be modified to find all of the objects in the constraint (i.e.—both the "employee" and the "employee's manager), and all of those objects can then be passed to the constraint checker module. This however, would complicate the interface between modules by requiring more objects to be passed. Conversely, the constraint $C_1$ object identifier module can always pass just the update object $O_x$ to the constraint checker module, and all of the constraint objects can be found by the constraint checker module. This, however, would require a separate checker module for each object in each constraint.

As a further modification, the object identifier modules can be changed such that they examine the update statement and determine if certain objects of the constraint can be eliminated as potential constraint violators. For example, consider constraint $C_1$ of FIG. 3 wherein an employee's salary is limited to be less then $1.2\times$ the salary of his managers. When the salary of an employee $O_x$ is increased, constraint $C_1$ can be violated by $O_x$ himself; but, it cannot be violated by the manager of $O_x$ or any direct reports of $O_x$. Conversely, when the salary of employee $O_x$ is decreased, constraint $C_1$ can be violated by any direct reports of $O_x$; but it cannot be violated by $O_x$ himself. To implement the above, step 51-1 of the object identifier module 51 can be modified to examine the update statement and determine if "salary" is being increased or decreased for update object $O_x$. If the salary is being increased, then update object $O_x$ is listed as a constraint object and steps 51-2 thru 51-5 are bypassed. Otherwise, if salary is being decreased, then update object $O_x$ is not listed as a constraint object and steps 51-2 thru 51-5 are performed.

Accordingly, it is to be understood that the present invention is not limited to the specific examples that have been described in detail but is defined by the appended claims.

What is claimed is:

1. A method, in a data processing system, of imposing constraints on data files which store objects and their attributes, and which are changed by update statements, said method including the steps of:

defining said constraints such that an attribute of one object is required to have a predetermined non-matching relationship with an attribute of at least one other object;

identifying a particular object which has a particular attribute that is being updated;

locating an applicable constraint based on said particular attribute;

converting said identified particular object of said update to at least one other object which is in said applicable constraint and is different than said particular object; and, generating an error message, if after said update, said non-matching relationship of said applicable constraint is not satisfied by any object from said converting step.

2. A method according to claim 1 wherein said converting step converts said particular object of said update to multiple objects which are all different from said object of said update.

3. A method according to claim 1 wherein said converting step converts said particular object of said update to a single object which is different from said object of said update.

4. A method according to claim 1 wherein said converting step converts said particular object of said update to another object which is stored in one file while said object of said update is stored in a different file.

5. A method according to claim 1 wherein said converting step includes the substeps of reading a file for said object of said update, conditionally branching on an attribute therein, and generating an object in said applicable constraint depending on said branch.

6. A method according to claim 1 wherein said converting step includes the substeps of reading a file for said object of said update, conditionally branching on an attribute therein, reading another file for another object depending on said branch, and generating an object in said applicable constraint from said another file.

7. A method according to claim 1 wherein said converting step includes the substep of examining said update statement to determine if certain objects can be eliminated as constraint violators.

8. A method according to claim 1 wherein said locating step finds multiple applicable constraints based on said particular attribute being updated; and for each such applicable constraint, said converting step converts said object of said update to a respective set of objects which are all different from each other.

9. A method according to claim 1 wherein said locating step includes the substep of correlating said particular attribute of said update to an applicable constraint via a table.

10. A method according to claim 1 wherein said locating step includes the substep of examining said constraints to determine if they include said particular attribute of said update.

11. A method according to claim 1 wherein said generating step includes the substeps of providing respective constraint checker programs for each of said applicable constraints, and sequentially passing said objects from said converting step to said constraint checker programs.

* * * * *